(12) United States Patent
Fischer et al.

(10) Patent No.: US 6,926,303 B2
(45) Date of Patent: Aug. 9, 2005

(54) INFLATABLE VEHICLE OCCUPANT PROTECTION DEVICE WITH INFLATION FLUID DEFLECTOR

(75) Inventors: Kurt F. Fischer, Oxford, MI (US); AnnMarie McMillian, Romeo, MI (US)

(73) Assignee: TRW Vehicle Safety Systems Inc., Washington, MI (US)

(*) Notice: Subject to any disclaimer, the term of this patent is extended or adjusted under 35 U.S.C. 154(b) by 109 days.

(21) Appl. No.: 10/679,573

(22) Filed: Oct. 6, 2003

(65) Prior Publication Data

US 2005/0073139 A1 Apr. 7, 2005

(51) Int. Cl.[7] .............................................. B60R 21/24
(52) U.S. Cl. ........................ 280/729; 280/740; 280/742
(58) Field of Search .............................. 280/729, 730.1, 280/730.2, 731, 732, 736, 739, 740, 742, 743.2

(56) References Cited

U.S. PATENT DOCUMENTS

| | | |
|---|---|---|
| 3,727,942 A | 4/1973 | Arnston et al. |
| 3,836,169 A | 9/1974 | Schiesterl |
| 3,874,693 A | 4/1975 | Patzelt et al. |
| 5,018,762 A | 5/1991 | Suzuki et al. |
| 5,249,824 A | 10/1993 | Swann et al. |
| 5,913,535 A * | 6/1999 | Taguchi et al. ............. 280/729 |
| 5,957,485 A | 9/1999 | Hirai |
| 6,086,092 A | 7/2000 | Hill |
| 6,241,283 B1 | 6/2001 | Zarazua |
| 6,361,067 B1 * | 3/2002 | Varcus et al. ............... 280/729 |
| 6,382,662 B1 * | 5/2002 | Igawa ......................... 280/729 |
| 6,530,595 B2 * | 3/2003 | Masuda et al. ........... 280/730.2 |
| 6,612,609 B1 * | 9/2003 | Rodriguez et al. .......... 280/729 |
| 6,676,158 B2 * | 1/2004 | Ishikawa .................. 280/743.1 |
| 6,834,884 B2 * | 12/2004 | Gu ............................. 280/729 |

FOREIGN PATENT DOCUMENTS

DE 19858690 A1 6/2000

OTHER PUBLICATIONS

Co–pending U.S. Appl. No. 09/690,429, filed Oct. 17, 2000 entitled "Inflatable Air Bag".

* cited by examiner

Primary Examiner—Paul N. Dickson
Assistant Examiner—Toan C To
(74) Attorney, Agent, or Firm—Tarolli, Sundheim, Covell & Tummino, L.L.P.

(57) ABSTRACT

An apparatus (10) includes an inflatable vehicle occupant protection device (14) with an upper portion (38) and a lower portion (40) in an inflated condition in the vehicle. A fabric deflector tube (60) is located in the inflatable vehicle occupant protection device (14) and has opposite first and second ends (62, 64). The first the end (62) is completely closed. The deflector tube has a first outlet (66, 68) adjacent the closed end (62) for directing a first amount of inflation fluid from an inflator (32) to the upper portion (38) of the inflatable vehicle occupant protection device (14). The second end (64) of the fabric deflector tube (60) is completely open and defines a second outlet for directing a second amount of inflation fluid, larger than the first amount of inflation fluid, from the inflator (32) to the lower portion (40) of the inflatable vehicle occupant protection device (14).

7 Claims, 2 Drawing Sheets

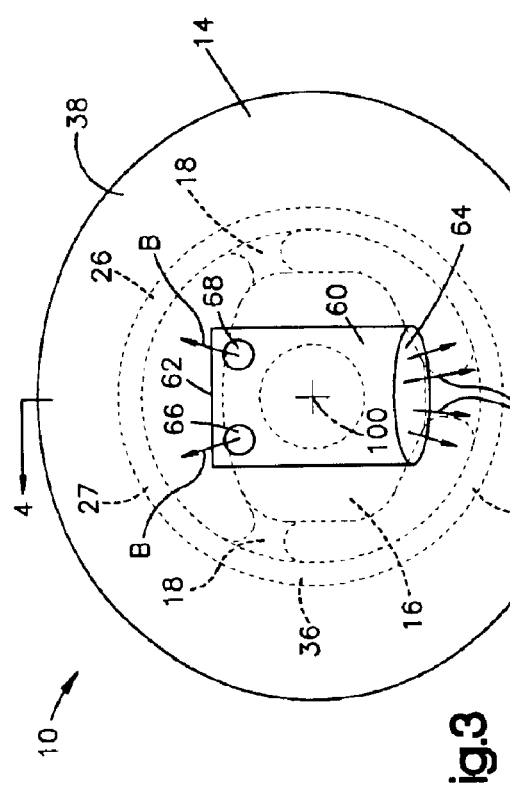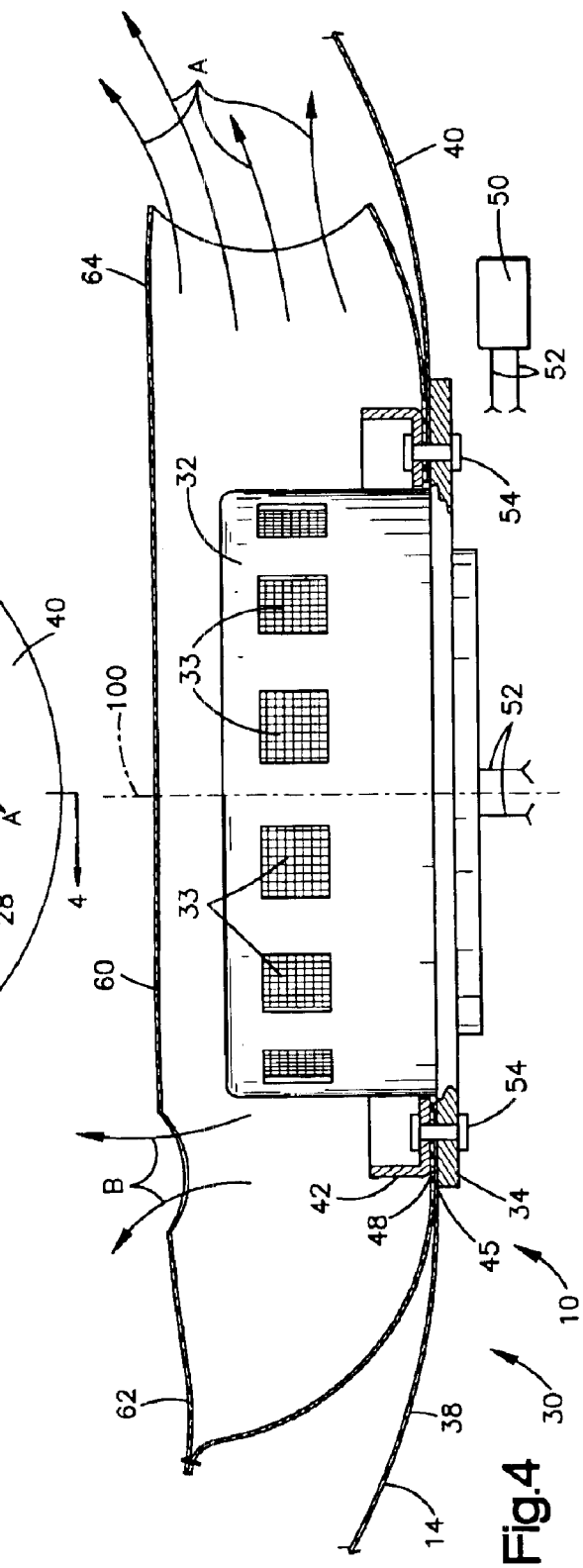

INFLATABLE VEHICLE OCCUPANT PROTECTION DEVICE WITH INFLATION FLUID DEFLECTOR

TECHNICAL FIELD

The present invention is directed to an inflatable vehicle occupant protection device for helping to protect an occupant of a vehicle upon the occurrence of an event for which occupant protection is desired, such as a vehicle collision.

BACKGROUND OF THE INVENTION

It is known to provide an inflatable vehicle occupant protection device, such as an air bag, for helping to protect an occupant of a vehicle. A driver side air bag is inflatable between an occupant of a front seat of the vehicle and the steering wheel of the vehicle. When inflated, the air bag helps protect an occupant from impacts with parts of the vehicle, such as the steering wheel of the vehicle.

The occupant may be seated in close proximity to the steering wheel, such as when the occupant's seat is in the full forward seating position. In the full forward seating position, the bottom portion of the steering wheel may be closer to the occupant than the top portion.

During a vehicle collision, when the inflator is actuated, a close proximity occupant may contact the bottom portion of the inflating air bag in less time than the top portion of the inflating air bag. If an occupant is in close proximity to the steering wheel when the inflator is actuated, the air bag may not have enough time to inflate sufficiently to cover both the top and bottom portions of the steering wheel before the occupant contacts the air bag.

SUMMARY OF THE INVENTION

An apparatus for helping to protect an occupant of a vehicle includes an inflatable vehicle occupant protection device. The inflatable vehicle occupant protection device has an upper portion and a lower portion in an inflated condition in the vehicle. The apparatus includes an inflator for providing inflation fluid for inflating the inflatable vehicle occupant protection device.

The apparatus also includes a fabric deflector tube located in the inflatable vehicle occupant protection device for directing a flow of the inflation fluid from the inflator into the inflatable vehicle occupant protection device. The fabric deflector tube has opposite first and second ends. The first end of the fabric deflector tube is completely closed. The fabric deflector tube has a first outlet adjacent the closed end for directing a first amount of inflation fluid from the inflator to the upper portion of the inflatable vehicle occupant protection device.

The second end of the fabric deflector tube is completely open and defines a second outlet for directing a second amount of inflation fluid, larger than the first amount of inflation fluid, from the inflator to the lower portion of the inflatable vehicle occupant protection device.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 is a schematic illustration of a portion of the apparatus of FIG. 2 with part of the apparatus omitted;

FIG. 4 is an enlarged sectional view of a portion of the apparatus taken generally along the line 4—4 in FIG. 3.

DESCRIPTION OF PREFERRED EMBODIMENTS

Figure 1:
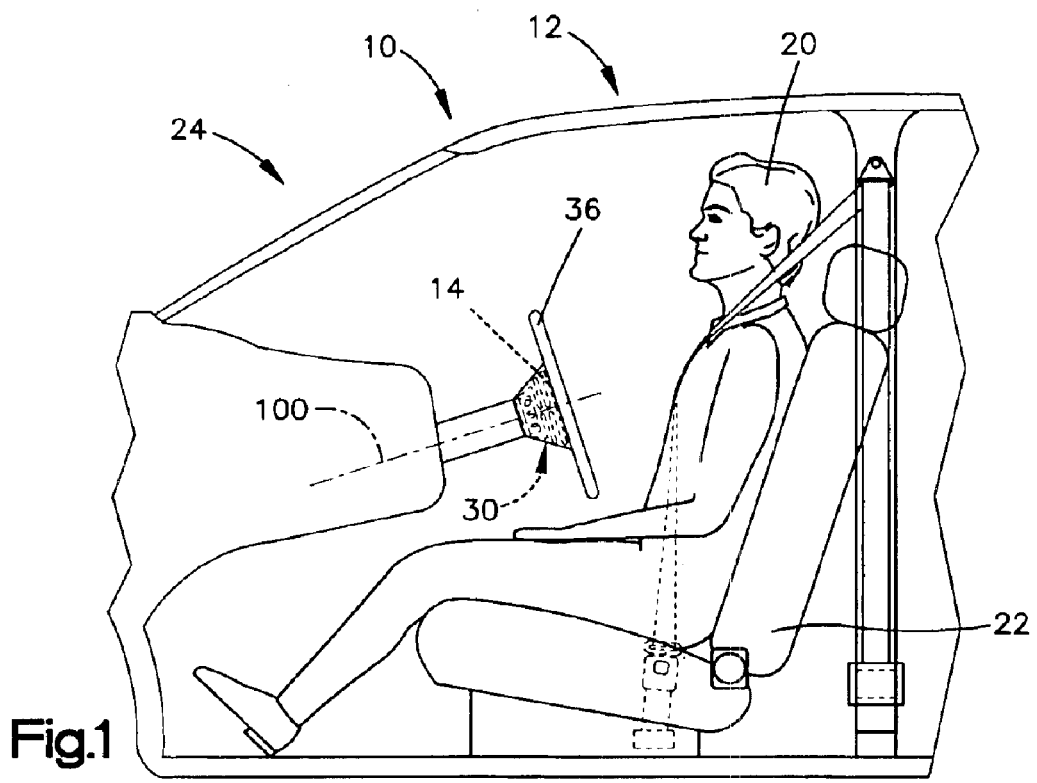
FIG. 1 is a schematic illustration of an apparatus according to a first embodiment of the invention.

The present invention is directed to an inflatable vehicle occupant protection device for helping to protect an occupant of a vehicle upon the occurrence of an event for which occupant protection is desired, such as a vehicle collision. As representative of the present invention, FIG. 1 illustrates an apparatus 10 that includes an inflatable vehicle occupant protection device in the form of an air bag 14 for helping to protect a vehicle occupant 20. The occupant 20 is positioned in a seat 22 and is the driver of the vehicle 12. The air bag 14 illustrated in FIG. 1 is a driver side air bag.

The air bag 14 is part of an air bag module 30 that includes an inflator 32. The module 30 is connected to a steering wheel 36. The air bag 14 has a stored condition, indicated by dashed lines in FIG. 1, in which the air bag is folded and secured to a reaction plate 34 (FIG. 4). The reaction plate 34 helps support the air bag 14 and inflator 32 on the steering wheel 36.

The material from which the air bag is constructed may be any material suitable for air bag construction, such as polyester or nylon. The air bag material may be laminated with a film or coated with silicone, urethane, or any other known suitable material.

The steering wheel 36 (FIG. 3) rotates about an axis 100. The steering wheel 36 has a central hub 16, a rim 26 and a plurality of spokes 18 interconnecting the hub and the rim. The steering wheel rim 26 has an upper portion 27 and a lower portion 28.

The inflator 32 is actuatable to provide inflation fluid for inflating the air bag 14. The inflator 32 is schematically illustrated and may be of any known type, such as stored gas, solid propellant, augmented, or hybrid.

Referring to FIG. 4, the inflator 32 includes a plurality of inflation fluid outlets 33. The inflation fluid outlets 33 are evenly distributed around the circumference of the inflator 32. The path of flow of the inflation fluid out of the inflator outlets 33 is in a plurality of radial directions around the circumference of the inflator perpendicular to the axis 100.

The apparatus 10 includes a sensor, illustrated schematically at 50 in FIG. 4, for sensing an event for which inflation of the air bag 14 is desired, such as a collision. The inflator 32 is operatively connected to the sensor 50 via lead wires 52.

Figure 2:
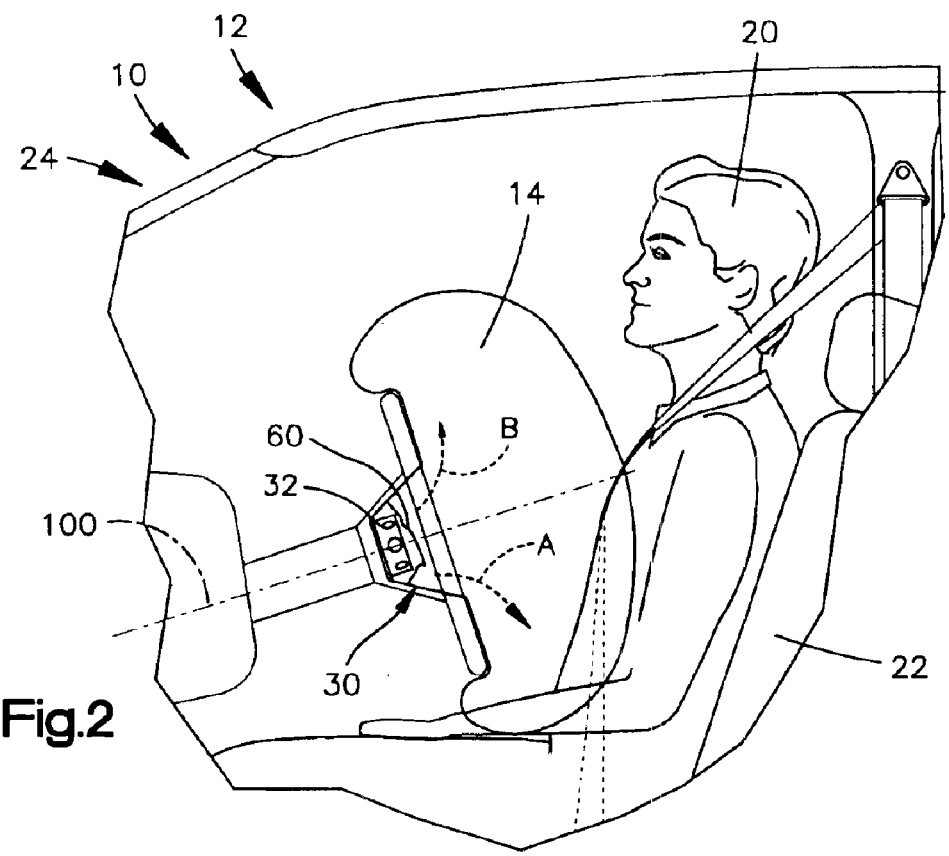
FIG. 2 is a schematic view of the apparatus of FIG. 1 illustrating some parts in another condition.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the air bag 14 in a known manner. The air bag 14 inflates from the stored condition to a deployed condition (FIG. 2). The air bag 14, while inflated, helps protect the vehicle occupant 20 from impacts with the steering wheel 36.

As illustrated in FIG. 3, the air bag 14 has a upper portion 38 and a lower portion 40 in the deployed condition. The upper portion 38 of the inflated air bag 14 is located adjacent the upper portion 27 of the steering wheel rim 26. The lower portion 40 of the inflated air bag 14 is located adjacent the lower portion 28 of the steering wheel rim 26.

The apparatus 10 includes a fabric deflector tube 60. The fabric deflector tube 60 is made from a rectangular piece of fabric having its opposite ends overlapped and sewn together to form a tube shape. The fabric from which the deflector tube 60 is constructed may be any suitable fabric material, such as those used to construct the air bag 14, e.g., polyester or nylon. The material used to construct the fabric deflector tube 60 may be laminated with a film or coated with silicone, urethane, or any other known suitable materials.

The fabric deflector tube 60 has opposite first and second ends 62 and 64. The first end 62 of the fabric deflector tube 60 is sewn closed. As illustrated in FIG. 3, the fabric deflector tube 60 includes two small circular outlets 66 and 68 in the peripheral wall of the deflector tube 60 adjacent the closed first end 62. The two outlets 66 and 68 direct inflation fluid provided by the inflator 32. The two outlets 66 and 68 in the fabric deflector tube 60 are located adjacent the upper portion 38 of the air bag 14 to direct inflation fluid into the upper portion 38.

The second end 64 of the fabric deflector tube 60 is not sewn closed but rather is left open. The open second end 64 defines a single large circular outlet for directing inflation fluid provided by the inflator 32. The open second end 64 of the fabric deflector tube 60 is located adjacent the lower portion 40 of the air bag 14 to direct inflation fluid into the lower portion 40.

The fabric deflector tube 60 includes a circular edge portion 48 that defines a circular opening (FIG. 4). The opening and edge portion 48 are located between the first and second ends 62 and 64 of the fabric deflector tube 60. The inflator 32 extends into the deflector tube 60 through the opening defined by the edge portion 48.

As illustrated in FIG. 4, the air bag 14 includes a mouth portion 45 that defines a circular opening. The air bag mouth portion 45 is mounted to the reaction plate 34. The edge portion 48 of the fabric deflector tube is sandwiched between the air bag mouth portion 45 and a retainer 42 so that the fabric deflector tube 60 is located inside the air bag 14. Fasteners 54 secure the retainer 42, air bag 14, fabric deflector tube 60 and inflator 32 to the reaction plate 34 inside the air bag module 30.

In the assembled condition of the air bag module 30, the fabric deflector tube 60 is a part of the module and is located inside the air bag 14. The circular opening in the deflector tube 60 defined by the edge portion 48 is aligned with the opening in the air bag 14 defined by mouth portion 45. The inflator outlets 33 are located inside the fabric deflector tube 60. When the inflator is actuated, inflation fluid directed from the inflator outlets 33 enters the fabric deflector tube 60. The fabric deflector tube 60 directs inflation fluid through the outlets 66 and 68 and through the open second end 64 of the deflector tube 60 into the air bag 14.

The area of the open second end 64 of the fabric deflector tube 60 is larger than the combined area of the two smaller outlets 66 and 68. In one embodiment, for example, the open second end 64 may be approximately 3.6 times larger than the combined area of the smaller outlets 66 and 68. As a result, the amount of inflation fluid directed from the inflator 32 through the open second end 64 of the fabric deflector tube 60 may be approximately 3.6 times greater than the amount of inflation fluid directed from the inflator 32 through both of the small outlets 66 and 68.

The larger area of the open second end 64 of the fabric deflector tube 60 may be in any suitable ratio to the combined area of the smaller outlets 66 and 68 and may be in a range of 3–6 times larger.

Referring to FIG. 3, since the open second end 64 is located adjacent the lower portion 40 of the air bag 14 and the smaller outlets 66 and 68 are located adjacent the upper portion 38 of the air bag, the fabric deflector tube 60 directs a substantially larger amount of inflation fluid into the lower portion 40 of the air bag (indicated at arrows A) as compared to the amount of inflation fluid directed into the upper portion 38 of the air bag 14 (indicated at arrows B).

Consequently, for a given period of inflation time the lower portion 40 of the air bag 14 receives a volume of inflation fluid greater than that received by the upper portion 38. This large volumetric flow into the lower portion 40 of the air bag 14 helps the air bag cover the lower portion 28 of the steering wheel rim 26 quickly. Therefore, an occupant 20 sitting in close proximity to the steering wheel 36 is more likely to contact the inflated lower portion 40 of the air bag 14, rather than the lower portion 28 of the steering wheel rim 26.

It is to be understood that the smaller amount of inflation fluid (arrows B) directed to the upper portion 38 of the air bag 14 through the smaller outlets 66 and 68 of the fabric deflector tube 60 is sufficient to inflate and deploy the upper portion 38 of the air bag to cover the upper portion 27 of the steering wheel rim 26. Thus, an occupant 20 sitting in close proximity to the steering wheel 36 should contact the inflated upper portion 38 of the air bag 14, rather than the upper portion 27 of the steering wheel rim 26.

The apparatus of the present invention is advantageous in helping to protect occupants of a vehicle upon the occurrence of an event for which occupant protection is desired, such as a vehicle collision. The apparatus is especially advantageous in helping to protect an driver of the vehicle who is sitting in close proximity to the steering wheel, such as when the driver's seat is in the full forward position.

The fabric deflector tube 60 of the present invention advantageously directs a larger amount of inflation fluid to the lower portion of the air bag to inflate the lower portion of the air bag more quickly than if a fabric deflector tube was not present in the air bag. Thus, the lower portion of the air bag covers the lower portion of the steering wheel quickly without increasing the amount of inflation fluid used to inflate the air bag.

From the above description of the invention, those skilled in the art will perceive improvements, changes and modifications. For example, the fabric deflector tube may be mounted in the inside of the air bag in a different manner, such as being sewn to an inner wall surface of the air bag instead of being sandwiched between the air bag and the retainer. Also, the fabric deflector tube could be used with a passenger side air bag. Such improvements, changes and modifications within the skill of the art are intended to be covered by the appended claims.

Having described the invention, the following is claimed:

1. An apparatus for helping to protect an occupant of a vehicle, said apparatus comprising:

an inflatable vehicle occupant protection device, said inflatable vehicle occupant protection device in an inflated condition in the vehicle having an upper portion and a lower portion;

an inflator for providing inflation fluid for inflating said inflatable vehicle occupant protection device; and a fabric deflector tube located in said inflatable vehicle occupant protection device for directing a flow of said inflation fluid from said inflator into said inflatable vehicle occupant protection device;

said fabric deflector tube having opposite first and second ends, the first end being completely closed, said deflector tube having a first outlet adjacent said closed end for directing a first amount of inflation fluid from said inflator to said upper portion of said inflatable vehicle occupant protection device, said second end of said fabric deflector tube being completely open and defining a second outlet for directing a second amount of inflation fluid, larger than said first amount of inflation fluid, from said inflator to said lower portion of said inflatable vehicle occupant protection device.

2. The apparatus according to claim 1, further comprising a steering wheel having a central hub, a rim and at least one spoke interconnecting the hub and the rim, said inflatable vehicle occupant protection device being located on said steering wheel.

3. The apparatus according to claim 2, wherein said upper portion of said inflatable vehicle occupant protection device in said inflated condition covers an upper portion of said rim and said lower portion of said inflatable vehicle occupant protection device in said inflated condition covers a lower portion of said rim.

4. The apparatus according to claim 1, wherein said fabric deflector tube is sandwiched between a mouth portion of said inflatable vehicle occupant protection device and a retainer around said inflator so that said fabric deflector tube is located inside said inflatable vehicle occupant protection device.

5. The apparatus according to claim 1, wherein said first outlet comprises two separate outlet openings.

6. The apparatus according to claim 5, wherein said second outlet comprises one outlet opening larger in area than said first outlet.

7. The apparatus according to claim 6, wherein the area of said second outlet is approximately 3.6 times larger than a combined area of said first outlet.

* * * * *